US007779420B1

(12) United States Patent
Puttu et al.

(10) Patent No.: US 7,779,420 B1
(45) Date of Patent: Aug. 17, 2010

(54) VERIFYING INFORMATION STORED ON A MANAGED NETWORK DEVICE

(75) Inventors: Sathyanarayana Nagendra Puttu, Bangalore (IN); Swathi M. Koundinya, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 972 days.

(21) Appl. No.: 10/674,577

(22) Filed: Sep. 29, 2003

(51) Int. Cl.
*G06F 9/44* (2006.01)
*G06F 7/04* (2006.01)
*H04L 9/32* (2006.01)

(52) U.S. Cl. .................... 719/318; 713/170; 726/7

(58) Field of Classification Search ......... 709/201–207, 709/217–219, 223–226; 707/1–10, 100–104.1; 713/164–179; 719/311, 318; 726/23–27, 726/7
See application file for complete search history.

(56) References Cited

U.S. PATENT DOCUMENTS

| 5,737,518 | A  | * | 4/1998  | Grover et al. | 714/38  |
|-----------|----|---|---------|---------------|---------|
| 5,822,569 | A  | * | 10/1998 | McPartlan et al. | 703/21 |
| 5,954,797 | A  | * | 9/1999  | Sidey          | 709/223 |
| 6,324,646 | B1 | * | 11/2001 | Chen et al.    | 726/6   |
| 6,363,421 | B2 | * | 3/2002  | Barker et al.  | 709/223 |
| 6,664,978 | B1 | * | 12/2003 | Kekic et al.   | 715/733 |
| 6,697,970 | B1 | * | 2/2004  | Chisholm       | 714/48  |
| 7,010,782 | B2 | * | 3/2006  | Narayan et al. | 717/124 |
| 2002/0032761 | A1 | * | 3/2002 | Aoyagi et al. | 709/223 |
| 2003/0131096 | A1 | * | 7/2003 | Goringe et al. | 709/224 |
| 2004/0030922 | A1 | * | 2/2004 | Koss          | 713/201 |

OTHER PUBLICATIONS

Kwan Philip "WhitePaper: IronShield Best Practices Hardening Foundry Routers & Switches" Foundry Networks Inc. version 1.0.1 Feb. 2003 pp. 1-104.*
Intel, "Network Information Library, SNMP: Overview," http://www.intel.com/support/si/library/bi0505.htm, data retrieved Jan. 15, 2004, pp. 1-4.
Tivoli, "NetView for UNIX User's Guide for Beginners," *Chapter 2, Understanding Network Management*, http://as400bks.rochester.ibm.com/tividd/td/netview/dux10mst/en_US/HTML/dux10m05.htm, data retrieved Jan. 15, 2004, pp. 1-7.
David Perkins, et al., "Understanding SNMP MIBs," 1997, Chapter 6, SNMP operations, 21 pages.

\* cited by examiner

*Primary Examiner*—Hyung S Sough
*Assistant Examiner*—Charles E Anya
(74) *Attorney, Agent, or Firm*—Hickman Palermo Truong & Becker LLP

(57) ABSTRACT

A method and mechanism for verifying information on a managed device is provided. A request is received at a managed device that contains one or more values that comprise proposals for a correct value of a managed object of the managed device. The managed object may be a SNMP MIB object. The managed object may store information for any attribute for the managed device. Next, a determination is made as to whether any of the one or more values in the request match the correct value of the managed object. Thereafter, a notification message is transmitted from the managed device to a management station that indicates whether any of the one or more values in the request match the correct value of the managed object. The notification message may identify which one of the one or more values in the request matches the correct value of the managed object.

24 Claims, 4 Drawing Sheets

VERIFYING INFORMATION STORED ON A MANAGED NETWORK DEVICE

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The present invention relates to the management of information stored on devices in a network.

BACKGROUND OF THE INVENTION

A network device operating system is a software system that provides for the management of network components. The appropriate components of the network device operating system may be installed in each network component, thereby creating a single, unified infrastructure for managing resources through a network. The network components may be managed by an external party, e.g., a network management station (NMS), using the network device operating system. A network device operating system may connect different platforms, LAN segments, and networking components, such as, for example, standalone routers, router modules for shared-media hubs, switches, PC and workstation file servers, WAN access switches, and ATM-capable PBXs. Any network component that is capable of being managed by a management station is referred to herein as a managed device. Examples of NMS's include Campus Manager, available from Cisco Systems, Inc. of San Jose, Calif., and OpenView, available from Hewlett Packard Company of Palo Alto, Calif.

Management stations require information identifying various attributes of the managed device when performing management operations. Attributes are information stored on the managed device that specify a value for feature that may be managed. Some attributes are stored in SNMP MIB objects on the managed device. Non-limiting examples of attributes are a read only community string (RO), a read/write community string (RW), a telnet password, an enable password, and a local username. For example, for security reasons, a management station requires a SNMP write community string, a telnet password, and an enable password to upgrade a software image on the managed device. The management station needs the attribute information in performing such tasks as using a telnet command to contact the managed device and modifying the boot commands on the managed device so that the managed device boots with the new image.

If a management station does not have a complete set of correct attribute information for a managed device, then the management station will not be able to perform any operation that depends on a particular attribute for which the management station does not have a correct value. Accordingly, the management station initially records all the attribute information of the managed device to facilitate the management of the managed device. The management station maintains a set of attribute information for each managed device that the management station manages.

The management station relies upon the validity of the attribute information, maintained for a managed device by the management station, in the performance of management functionality. For example, once a device is managed by a management station, the management station may attempt to fetch the startup and running configurations of the managed device. However, if any of the attribute information of the managed device used by the management station in fetching the startup and running configurations of the managed device is incorrect (e.g., the telnet password is incorrect or the read/write community string is incorrect), then the fetch operation will fail. The attributes stored by the management station could be incorrect because another user has changed an attribute value at the device.

Storing an incorrect value for a first attribute value may prevent the management station from obtaining or verifying the correctness of values for other attributes. For example, in order to determine whether a value for a managed device's telnet enable password is correct, a management station may establish a telnet session with the managed device. After the telnet session is established with the managed device, the management station using the telnet session to verify whether the stored telnet enable password is correct. However, if the telnet session cannot be established with the managed device because the management station has stored an incorrect value of the telnet password, then the management station is unable to verify whether the telnet enable password is correct.

Additional problems may arise if a user of the managed device customizes any session prompts. For example, a user of a managed device may customize the prompts of a telnet session on the managed device. After a management station establishes a telnet connection with the managed device, if the prompts in the telnet session have been changed by a user, then the management station may interpret the attempt to communicate over the telnet session as a failure because the management station is dependent upon an expected prompt pattern in the telnet session. Thus, for every managed device that is managed by the management station, information about the prompt pattern needs to be stored and updated. However, users of the managed device are likely to customize the prompt pattern without knowledge of the management station, which impedes the ability of the management station to communicate with the managed device.

The read/write community string is an essential attribute for managing devices because it acts as a security credential; an SNMP agent in a managed device will not grant read/write access to a MIB in the device unless a requesting process provides the valid community string. Unfortunately, however, currently there is no way of verifying the correctness of the read/write community string. For example, an attempt by the management station to set a value on a particular attribute to verify the correctness of the read/write community string associated with the managed device would not be acceptable to the users of the managed device for security concerns.

Accordingly, there is a need for a method and mechanism that provides for verifying attribute information stored on managed devices without incurring the disadvantages of the prior art.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for verifying information on a managed device is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

In an embodiment, a request is received that contains one or more values that comprise proposals for a correct value of a managed object of the managed device. In an embodiment, a managed object may be a SNMP MIB object. The managed object may store information for any attribute of the managed device. For example, the managed object may store a username or a password for the telnet protocol, the SSH protocol, the TFTP protocol, the RCP protocol, the SNMP protocol, the TACACS protocol, or the RADIUS protocol. The request, which may be a SNMP request, may be sent from the management station to the managed device.

Next, a determination is made as to whether any of the one or more values in the request match the correct value of the managed object. Thereafter, a notification message is transmitted that indicates whether any of the one or more values in the request match the correct value of the managed object. The notification message may identify which one of the one or more values in the request matches the correct value of the managed object. The notification message may be sent from the managed device to the management station.

Architecture Overview

Figure 1:
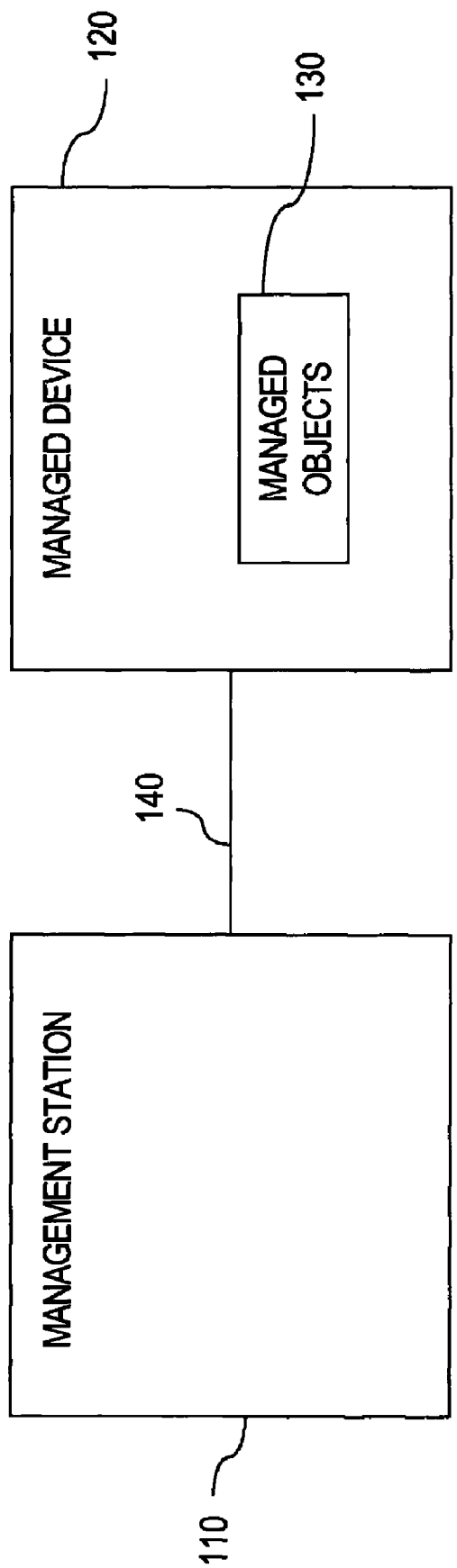
FIG. 1 is a block diagram illustrating the functional components of a management system.

FIG. 1 is a block diagram illustrating the functional components of a management system 100 according to an embodiment. As FIG. 1 illustrates, management system 100 includes management station 110, managed device 120, and communications link 140.

Management station 110 is used broadly herein to refer to any mechanism capable of managing, monitoring, or configuring managed device 120 over communications link 140. Management station 110 may issue requests to managed device 120 and receive responsive communication from managed device 120 over communications link 140 in the performance of managing managed device 120. An example of management station 110 is CiscoWorks Resource Manager Essentials, available from Cisco Systems, Inc. of San Jose, Calif.

Managed device 120 is used broadly herein to refer to any network component that may be remotely managed, monitored, or configured by management station 110 over communications link 140. Non-limiting examples of managed device 120 include standalone routers, router modules for shared-media hubs, switches, PC and workstation file servers, WAN access switches, and ATM-capable PBXs.

Managed device 120 stores one or more SNMP MIB objects 130. SNMP MIB objects are specifications containing definitions of management information so that managed device 120 can be remotely monitored, configured, and controlled. SNMP MIB objects 130 may be used to store information about any attribute of managed device 120, including those attributes illustrated in Table 1.

TABLE 1

| | |
|---|---|
| Read Only Community String (RO) | TACACS UserName |
| Read/Write Community String (RW) | TACACS Password |
| Telnet Password | Enable TACACS UserName |
| Enable Password | Enable TACACS Password |
| Enable Secret | RCP UserName |
| Local UserName | RCP Password |
| Local Password | |

Managed objects 130 are store attribute values for managed device 120. In an embodiment, each of the managed objects 130 may be a SNMP MIB object. Each SNMP MIB object is associated with a MIB object specification. The MIB object specification includes definitions for related management information, events and associated implementation compliance requirements. A MIB object specification for SNMP MIB objects 130 that are capable of storing attribute information for the attributes listed in Table 1 is provided in Table 2.

Communications link 140 may be implemented by any medium or mechanism that provides for the exchange of data between management station 110 and managed device 120. Examples of communications link 140 include, without limitation, a network such as a Local Area Network (LAN), Wide Area Network (WAN), Ethernet or the Internet, or one or more terrestrial, satellite or wireless links.

Some embodiments of management system 100 may feature additional components other than those graphically portrayed in FIG. 1, while other embodiments of management system 100 may not feature all the components graphically portrayed in FIG. 1. Consequently, embodiments are not limited to those graphically portrayed in FIG. 1, as FIG. 1 is merely illustrative of one embodiment.

Verifying Information on a Managed Device

Figure 2:
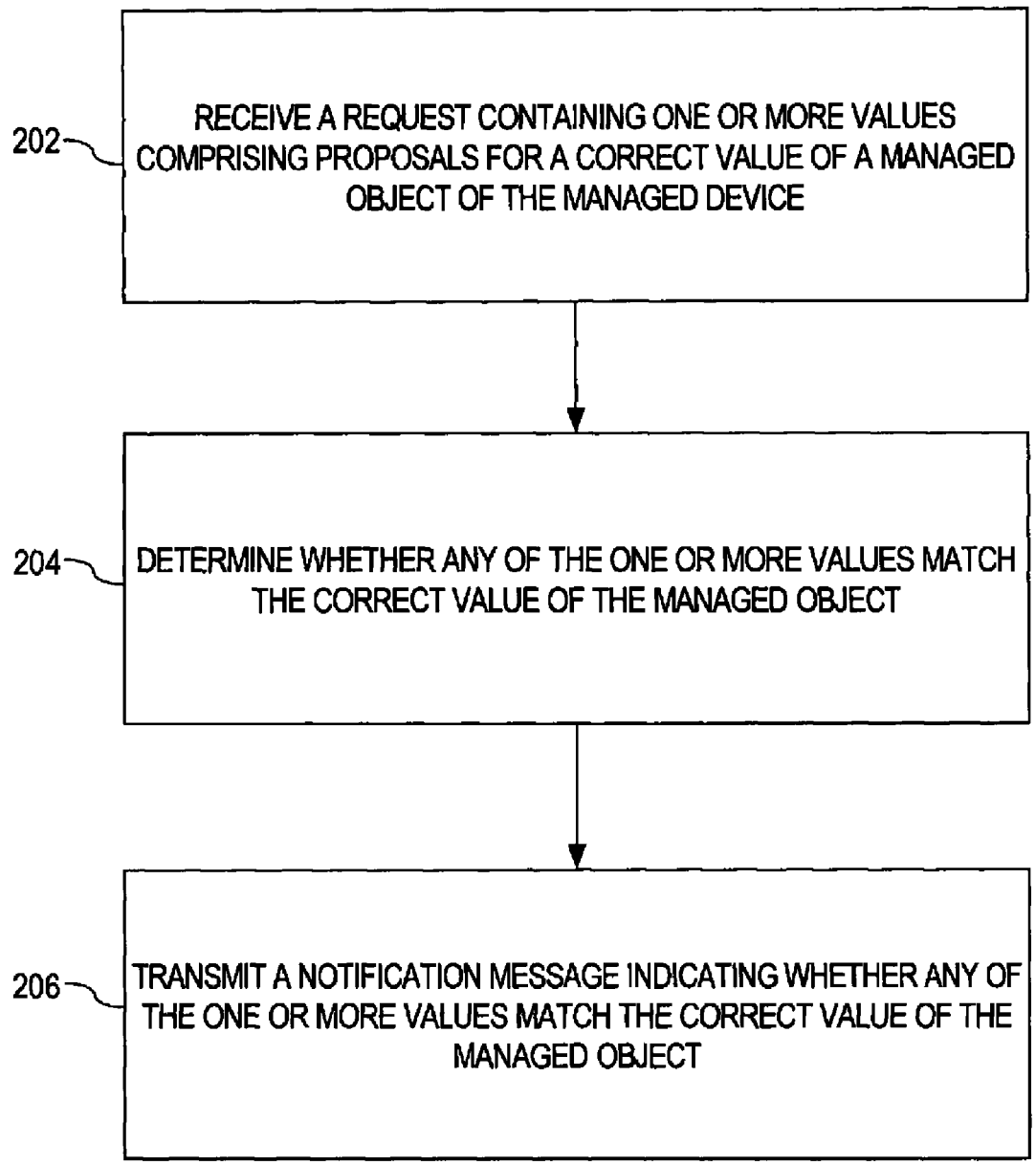
FIG. 2 is a flow chart illustrating the steps of verifying information on a managed device.

FIG. 2 is a flow chart 200 illustrating the steps of verifying information on a managed device according to an embodiment. In step 202, a request is received containing one or more values comprising proposals for a correct value of a managed object of the managed device. In an embodiment, the managed object may be a SNMP MIB object. In an embodiment, the request may be transmitted by management station 110 and may be received by managed device 120. The managed object, for which the one or more values in the request comprise proposals for a correct value, resides in the one or more managed objects 130 stored on managed device 120.

Figure 3:
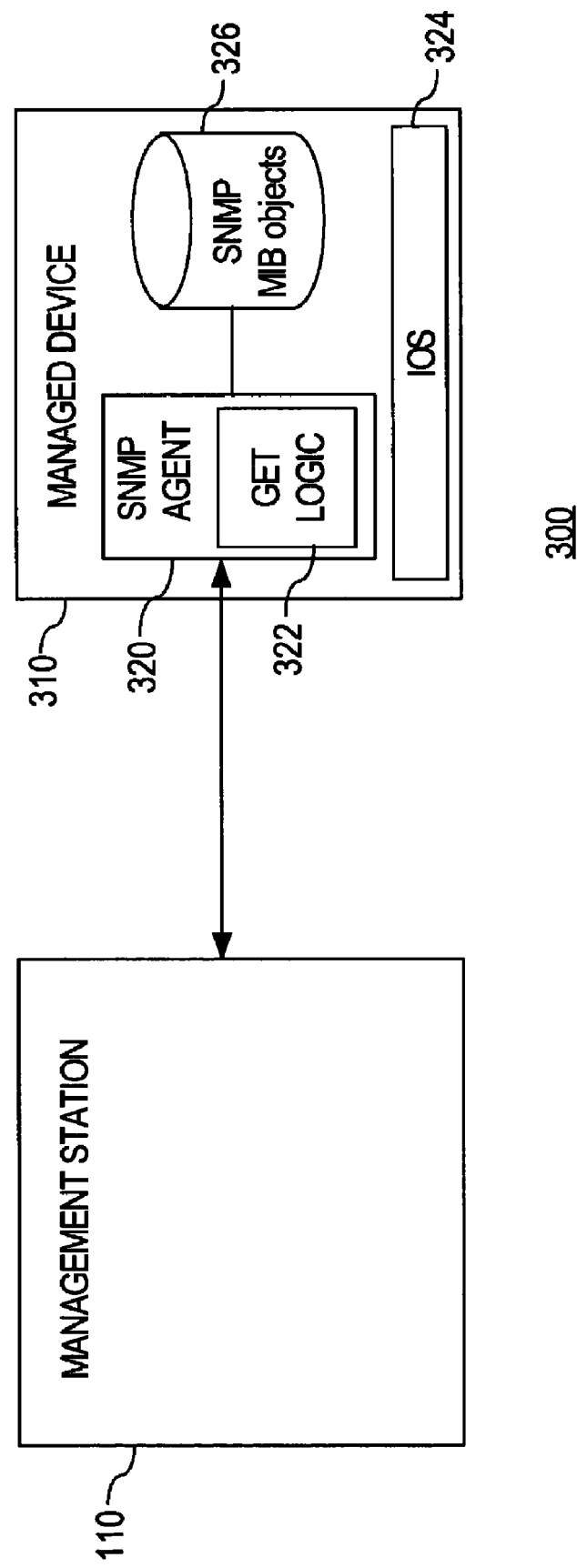
FIG. 3 is a block diagram illustrating the functional components of a management system.

In an embodiment illustrated in the block diagram of FIG. 3, the request received in step 202 may be received at a SNMP agent 320 located on the managed device 310. The SNMP agent 320 is a software entity that processes SNMP messages received and transmitted by managed device 310. SNMP agent 320 comprises get logic 322, which is a software entity that is capable of processing received SNMP messages, such as the request received in step 202. The managed device 310 may comprise an operating system, e.g., Cisco IOS 324, available from Cisco Systems, Inc. of San Jose, Calif. The SNMP agent 320 is coupled to the managed objects; for example, as illustrated in FIG. 3, SNMP agent 320 is coupled to SNMP MIB objects 326. Get logic 322 may access the SNMP MIB objects 326 in processing the request received in step 202.

In an embodiment, the request received in step 202 may conform to the SNMP protocol. Specifically, the request may conform to any of SNMP version 1, SNMP version 2, SNMP version 3, or any future version of SNMP. The request may be any of a SNMP GET request, a SNMP GETNEXT request, or a SNMP GETBULK request. In other embodiments, the request may not conform to the SNMP protocol.

In an embodiment wherein the request conforms to the SNMP protocol, the one or more values transmitted in the SNMP request may be stored in a VarBind portion of the request. The VarBind portion of a SNMP request corresponds to the array of one or more VarBinds that is contained within each SNMP request. In the embodiment depicted in FIG. 3, get logic 322 processes the VarBind portion of the SNMP request to determine the one or more values comprising proposals for a correct value of a managed object that are transmitted in the SNMP request.

In an embodiment, managed objects 130 store attributes for one or more protocols other than SNMP. For example, managed objects 130 may store a username or a password for a telnet protocol, a SSH protocol, a TFTP protocol, a RCP protocol, a SNMP protocol, a TACACS protocol, and a RADIUS protocol. Managed objects 130 may store attribute information for any attribute of the managed device, e.g., managed objects 130 may store attribute information for any attribute listed in Table 1.

Because one or more of the attributes stored in an object in the managed objects 130 may be a security credential, in an embodiment, the specification for one or more of the SNMP MIB object 130 is not disclosed to others by a party that implements software, hardware, or other elements that perform the steps of FIG. 2. Thus, a sender can issue requests, but does not know the specific object name or tree location of that object or its true value in the device.

In step 204, a determination is made as to whether any of the one or more values in the request received in step 202 match the correct value of the managed object. Managed device 120 checks each of the one or more values in the received request to determine which, if any, of the one or more values matches the correct value of the managed object. In one embodiment, when one of the one or more values in the request matches the correct value of the managed object, managed device 120 stops checking the remainder of the one or more values, and processing proceeds to step 206. In another embodiment, when one of the one or more values in the request matches the correct value of the managed object, managed device 120 continues to check the remainder of the one or more values in the request before processing continues to step 206. In the embodiment depicted in FIG. 3, SNMP agent 322 performs step 204. In other embodiments, other components on managed device 120 may perform step 204, e.g., get logic 322.

In step 206, a notification message is transmitted that indicates whether any of the one or more values match the correct value of the managed object. In an embodiment, the notification message is transmitted from managed device 120 to the management station 110. The notification message may be transmitted using SNMP, although it need not be. In the embodiment depicted in FIG. 3, SNMP agent 322 performs step 206. In other embodiments, other components on managed device 120 may perform step 206, e.g., get logic 322.

In an embodiment, the notification message identifies which one of the one or more values match the correct value of the managed object. For example, if the request contained only one value constituting a proposal for a correct value of the managed object, then a Boolean value could be contained in the notification message that indicates whether the one value contained in the request matched the correct value of the managed object. If the request contained more than one value constituting a proposal for a correct value of the managed object, then the notification message could contain information that indicates which, if any, of the two or more values in the request matches the correct value of the managed object, e.g., an index position to the value matching the correct value of the managed object could be provided.

In an embodiment, the step of 206 is performed by storing, in a specified object, e.g., a specified MIB object, in the managed objects 130 on managed device 120, a notification value that indicates whether any of the one or more values in the request match the correct value of the managed object. Thereafter, management station 110 may retrieve the notification value by transmitting a subsequent request to managed device 120 to read the notification value from the specified object in managed objects 130 containing the notification value.

In an embodiment, when the determination of step 204 indicates that none of the one or more values in the request match the correct value of the managed object, the notification message may include an error message that describes an encountered problem in determining whether the one or more values match the correct value of the managed object. The error message may indicate a reason or further description why a value in the request did not match the correct value of the managed object, or may include information regarding a problem was encountered in processing the request, e.g., information directed towards a problem in processing the request at managed device 120 that was encountered.

The steps illustrated in flow chart 200 provide a uniform method and mechanism for determining the correctness of attribute values of managed devices maintained by a management station. Attributes of different protocols (e.g., telnet, SSH, TFTP, RCP, SNMP, TACACS, and RADIUS) may be checked using a single protocol (e.g., such as SNMP). Accordingly, multiple device credentials in multiple protocols may be validated using a single protocol. Using the steps illustrated in flow chart 200, one or more proposed values of any attribute stored in a managed object, such as a SNMP MIB object, may be checked to determine if one of the proposed values is the correct value of the managed object.

Using the steps illustrated in flow chart 200, if a user changes the prompts of a session of a managed device, one or more values associated with the changed prompt session may be proposed by the management station to determine the correct value associated with the changed prompt session. Using this technique, if a user changes the prompts of a session of the managed device, the management station may identify the changed prompt structure using the functional steps of flow chart 200. Once the management station ascertains the identity of the changed prompt structure, the management station may be able to communicate with the managed device.

Using the steps illustrated in flow chart 200, one or more proposed values of the read/write community string may be checked to determine if one of the proposed values is the correct value. Consequently, the identity of the read/write community string associated with a managed device may be ascertained by the management station using the functional steps of flow chart 200.

A single management station may transmits requests containing one or more proposed values comprising proposals for a correct value of a SNMP MIB object to one or more managed devices using a single protocol.

Hardware Overview

Figure 4:
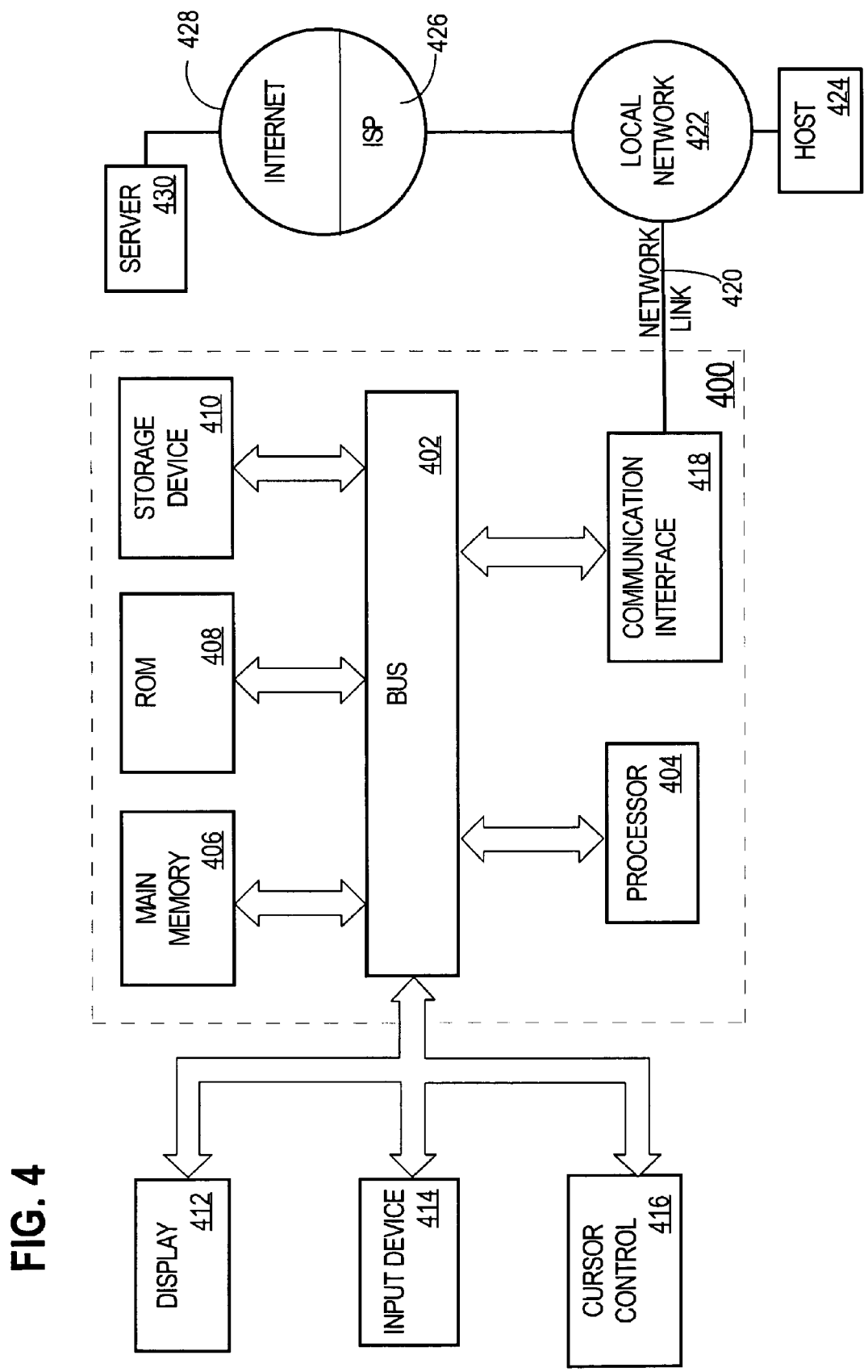
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for verifying information on a managed device. According to one embodiment of the invention, verifying information on a managed device is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for verifying information on a managed device as described herein.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX

TABLE 2

Copyright © 2003 Cisco Systems, Inc.

```
ciscoNMcredentials OBJECT-TYPE
        SYNTAX SEQUENCE OF DeviceCredentialsEntry
        ACCESS not-accessible
        STATUS mandatory
        DESCRIPTION
                "The device credentials table used for storing
                        the value of various device credentials."
        ::= { }
    deviceCredentialsEntry OBJECT-TYPE
        SYNTAX DeviceCredentialsEntry
        ACCESS not-accessible
        STATUS mandatory
        DESCRIPTION
                "Each entry contains one device credential variable and
                        its corresponding value."
        ::= { ciscoNMcredentials 1 }
        DeviceCredentialsEntry ::=
                SEQUENCE {
                        readCommunityString
                                DisplayString (SIZE (0..255)),
                        writeCommunityString
                                DisplayString (SIZE (0..255)),
                        enablePassword
                                DisplayString (SIZE (0..255)),
                        enableSecret
                                DisplayString (SIZE (0..255)),
                        telnetCreds
                                SEQUENCE OF TelnetCredsEntry,
                        localUserCreds
                                SEQUENCE OF LocalUserCredsEntry,
                        tacacsCreds
                                SEQUENCE OF TacacsCredsEntry,
                        enableTacacsCreds
                                SEQUENCE OF EnableTacacsCredsEntry,
                        rcpCreds
                                SEQUENCE OF RcpCredsEntry
                }
        readCommunityString OBJECT-TYPE
                                SYNTAX DisplayString (SIZE (0..255))
                                ACCESS read-only
                                STATUS mandatory
                                DESCRIPTION
                                        "A textual description of the entity. This value should
                                        hold a comma separated list of read community strings
                                        that are configured on the device. A query placed on
                                        this variable would return a boolean response (0 for a
                                        match, -1 for failure, an index into the received list
                                        which matches one of the community strings
                                        configured on the device)."
                                ::= { deviceCredentialsEntry 1 }
        writeCommunityString   OBJECT-TYPE
                                SYNTAX DisplayString (SIZE (0..255))
                                ACCESS read-only
                                STATUS mandatory
                                DESCRIPTION
                                        "A textual description of the entity. This value should
                                        hold a comma separated list of write community strings
                                        that are configured on the device. A query placed on
                                        this variable would return a boolean response (0 for a
                                        match, -1 for failure, an index into the received list
                                        which matches one of the community strings
                                        configured on the device)."
                                ::= { deviceCredentialsEntry 2 }
```

TABLE 2-continued

| | Copyright © 2003 Cisco Systems, Inc. | |
|---|---|---|
| enablePassword | OBJECT-TYPE<br>SYNTAX DisplayString (SIZE (0..255))<br>ACCESS read-only<br>STATUS mandatory<br>DESCRIPTION<br>    "A textual description of the entity. This value should hold the enable password that is configured on the device. A query placed on this variable would return a boolean response (0 for a match, −1 for failure or null/noSuchInstance if the value is not configured on the device or if the protocol is not supported)."<br>::= { deviceCredentialsEntry 3 } | |
| enableSecret | OBJECT-TYPE<br>SYNTAX DisplayString (SIZE (0..255))<br>ACCESS read-only<br>STATUS mandatory<br>DESCRIPTION<br>    "A textual description of the entity. This value should hold the enable secret password that is configured on the device. A query placed on this variable would return a boolean response (0 for a match, −1 for failure or null/noSuchInstance if the value is not configured on the device or if the protocol is not supported)."<br>::= { deviceCredentialsEntry 4 } | |
| telnetCreds | OBJECT-TYPE<br>SYNTAX SEQUENCE OF TelnetCredsEntry<br>ACCESS not-accessible<br>STATUS mandatory<br>DESCRIPTION<br>    "The device credentials table used for storing the value of device telnet credentials."<br>::= { deviceCredentialsEntry 5 } | |
| | telnetCredsEntry | OBJECT-TYPE<br>SYNTAX TelnetCredsEntry<br>ACCESS not-accessible<br>STATUS mandatory<br>INDEX   { telnetUserName }<br>DESCRIPTION<br>    "The device credentials table used for storing the value of device telnet credentials. For each additional Username/Password combination, a new set of username/password variables will be created"<br>::= { telnetCreds 1 } |
| | TelnetCredsEntry ::=<br>    SEQUENCE {<br>        telnetUserName<br>            DisplayString(SIZE (0..255)),<br>        telnetPassword<br>            DisplayString(SIZE (0..255))<br>    }<br>telnetUserName | OBJECT-TYPE<br>SYNTAX DisplayString (SIZE (0..255))<br>ACCESS read-only<br>STATUS mandatory<br>DESCRIPTION<br>    "A textual description of the entity. This value should hold the telnet username that is configured on the device. A query placed on this variable with a username/password combination, would return a boolean response (0 for a match, −1 for failure or null/no SuchInstance if the value is not configured on the device or it the protocol is not supported) after checks are made by agent on all the rows in this table. A match is found only if one of the rows match with the combination sent in the query."<br>::= { telnetCredsEntry 1 } |
| | telnetPassword | OBJECT-TYPE<br>SYNTAX DisplayString (SIZE (0..255))<br>ACCESS read-only<br>STATUS mandatory |

TABLE 2-continued

Copyright © 2003 Cisco Systems, Inc.

```
                                                DESCRIPTION
                                                        "A textual description of the entity. This
                                                        value should hold the telnet password
                                                        that is configured on the device. A query
                                                        placed on this variable with a
                                                        username/password combination, would
                                                        return a boolean response (0 for a match,
                                                        −1 for failure or null/noSuchInstance if
                                                        the value is not configured on the device
                                                        or it the protocol is not supported) after
                                                        checks are made by agent on all the rows
                                                        in this table. A match is found only if
                                                        one of the rows match with the
                                                        combination
                                                        sent in the query."
                                                ::= { telnetCredsEntry 2 }
localUserCreds                  OBJECT-TYPE
                        SYNTAX SEQUENCE OF LocalUserCredsEntry
                        ACCESS not-accessible
                        STATUS mandatory
                DESCRIPTION
                        "The device credentials table used for storing
                        the value of device local user credentials."
                        ::= { deviceCredentialsEntry 6 }
                                localUserCredsEntry             OBJECT-TYPE
                                                                SYNTAX       LocalUserCredsEntry
                                                                ACCESS not-accessible
                                                                STATUS mandatory
                                                                INDEX        { localUserName }
                                                        DESCRIPTION
                                                                "The device credentials table
                                                                used for storing the value of
                                                                device local user credentials. For
                                                                each additional
                                                                Username/Password
                                                                combination, a new set of
                                                                username/password variables
                                                                will be created"
                                                        ::= { localUserCreds 1 }
                        LocalUserCredsEntry ::=
                                SEQUENCE {
                                        localUserName
                                                DisplayString(SIZE (0..255)),
                                        localPassword
                                                DisplayString(SIZE (0..255))
                                }
                        localUserName   OBJECT-TYPE
                                        SYNTAX DisplayString (SIZE (0..255))
                                        ACCESS read-only
                                        STATUS mandatory
                                        DESCRIPTION
                                                "A textual description of the entity. This
                                                value should hold the local username
                                                that is configured on the device. A query
                                                placed on this variable with a
                                                username/password combination, would
                                                return a boolean response (0 for a match,
                                                −1 for failure or null/noSuchInstance if
                                                the value is not configured on the device
                                                or it the protocol is not supported) after
                                                checks are made by agent on all the rows
                                                in this table. A match is found only if
                                                one of the rows match with the
                                                combination
                                                sent in the query."
                                        ::= { localUserCredsEntry 1 }
                        localPassword OBJECT-TYPE
                                        SYNTAX DisplayString (SIZE (0..255))
                                        ACCESS read-only
                                        STATUS mandatory
                                        DESCRIPTION
                                                "A textual description of the entity. This
                                                value should hold the local username's
                                                password that is configured on the
                                                device. A query placed on this variable
                                                with a username/password combination,
                                                would return a boolean response (0 for a
```

TABLE 2-continued

Copyright © 2003 Cisco Systems, Inc.

|  |  |  |
|---|---|---|
|  |  | match, −1 for failure or null/noSuchInstance if the value is not configured on the device or it the protocol is not supported) after checks are made by agent on all the rows in this table. A match is found only if one of the rows match with the combination sent in the query." |
|  |  | ::= { localUserCredsEntry 2 } |
| tacacsCreds | OBJECT-TYPE SYNTAX SEQUENCE OF TacacsCredsEntry ACCESS not-accessible STATUS mandatory DESCRIPTION "The device credentials table used for storing the value of device TACACS credentials." ::= { deviceCredentialsEntry 7 } | |
|  | tacacsCredsEntry | OBJECT-TYPE SYNTAX    TacacsCredsEntry ACCESS not-accessible STATUS mandatory INDEX    { tacacsUserName } DESCRIPTION "The device credentials table used for storing the value of device TACACS credentials. For each additional Username/Password combination, a new set of username/password variables will be created" ::= { tacacsCreds 1 } |
|  | TacacsCredsEntry ::= SEQUENCE { tacacsUserName DisplayString(SIZE (0..255)), tacacsPassword DisplayString(SIZE (0..255)) } | |
|  | tacacsUserName | OBJECT-TYPE SYNTAX DisplayString (SIZE (0..255)) ACCESS read-only STATUS mandatory DESCRIPTION "A textual description of the entity. This value should hold the TACACS Username that is configured on the device. A query placed on this variable with a username/password combination, would return a boolean response (0 for a match, −1 for failure or null/noSuchInstance if the value is not configured on the device or it the protocol is not supported) after checks are made by agent on all the rows in this table. A match is found only if one of the rows match with the combination sent in the query." ::= { tacacsCredsEntry 1 } |
|  | tacacsPassword | OBJECT-TYPE SYNTAX DisplayString (SIZE (0..255)) ACCESS read-only STATUS mandatory DESCRIPTION "A textual description of the entity. This value should hold the TACACS password that is configured on the device. A query placed on this variable with a username/password combination, would return a boolean response (0 for a match, −1 for failure or null/noSuchInstance if the value is not configured on the device or it the protocol is not supported) after checks are made by agent on all the rows in this table. A match is found only if one of the rows match with the combination sent in |

TABLE 2-continued

Copyright © 2003 Cisco Systems, Inc.

```
                                                                      the query."
                                                                ::= { tacacsCredsEntry 2 }
enableTacacsCreds           OBJECT-TYPE
                            SYNTAX SEQUENCE OF EnableTacacsCredsEntry
                            ACCESS not-accessible
                            STATUS mandatory
                DESCRIPTION
                                    "The device credentials table used for storing
                                    the value of device Enable TACACS credentials."
                            ::= { deviceCredentialsEntry 8 }
                            enableTacacsCredsEntry              OBJECT-TYPE
                                                        SYNTAX      EnableTacacsCredsEntry
                                                        ACCESS not-accessible
                                                        STATUS mandatory
                                                        INDEX       { enableTacacsUserName
}
                                                        DESCRIPTION
                                                                    "The device credentials table
                                                                    used for storing the value of
                                                                    device Enable TACACS
                                                                    credentials. For each additional
                                                                    Username/Password
                                                                    combination, a new set of
                                                                    username/password variables
                                                                    will be created"
                                                        ::= { enableTacacsCreds 1 }
                            EnableTacacsCredsEntry ::=
                                    SEQUENCE {
                                            enableTacacsUserName
                                                    DisplayString(SIZE (0..255)),
                                            enableTacacsPassword
                                                    DisplayString(SIZE (0..255))
                                    }
                            tacacsUserName      OBJECT-TYPE
                            SYNTAX DisplayString (SIZE (0..255))
                            ACCESS read-only
                            STATUS mandatory
                            DESCRIPTION
                                                        "A textual description of the entity. This
                                                        value should hold the enable TACACS
                                                        Username that is configured on the
                                                        device. A query placed on this variable
                                                        with a username/password combination,
                                                        would return a boolean response (0 for a
                                                        match, −1 for failure or
                                                        null/noSuchInstance if the value is not
                                                        configured on the device or it the
                                                        protocol is not supported) after checks
                                                        are made by agent on all the rows in this
                                                        table. A match is found only if one of the
                                                        rows match with the combination sent in
                                                        the query."
                                                ::= { enableTacacsCredsEntry 1 }
                            tacacsPassword              OBJECT-TYPE
                            SYNTAX DisplayString (SIZE (0..255))
                            ACCESS read-only
                            STATUS mandatory
                            DESCRIPTION
                                                        "A textual description of the entity. This
                                                        value should hold the enable TACACS
                                                        password that is configured on the
                                                        device. A query placed on this variable
                                                        with a username/password combination,
                                                        would return a boolean response (0 for a
                                                        match, −1 for failure or
                                                        null/noSuchInstance if the value is not
                                                        configured on the device or it the
                                                        protocol is not supported) after checks
                                                        are made by agent on all the rows in this
                                                        table. A match is found only if one of the
                                                        rows match with the combination sent in
                                                        the query."
                                                ::= { enableTacacsCredsEntry 2 }
rcpCreds                    OBJECT-TYPE
                            SYNTAX SEQUENCE OF RcpCredsEntry
                            ACCESS not-accessible
                            STATUS mandatory
```

TABLE 2-continued

Copyright © 2003 Cisco Systems, Inc.

```
DESCRIPTION
            "The device credentials table used for storing
            the value of device RCP credentials."
    ::= { deviceCredentialsEntry 9 }
    rcpCredsEntry OBJECT-TYPE
                SYNTAX      RcpCredsEntry
                ACCESS not-accessible
                STATUS mandatory
                INDEX       { rcpUserName }
                DESCRIPTION
                            "The device credentials table used for
                            storing the value of device RCP
                            credentials. For each additional
                            Username/Password combination, a new
                            set of username/password variables will
                            be created"
                ::= { rcpCreds 1 }
RcpCredsEntry ::=
            SEQUENCE {
                rcpUserName
                            DisplayString(SIZE (0..255)),
                rcpPassword
                            DisplayString(SIZE (0..255))
            }
    rcpUserName OBJECT-TYPE
                SYNTAX DisplayString (SIZE (0..255))
                ACCESS read-only
                STATUS mandatory
                DESCRIPTION
                            "A textual description of the entity. This
                            value should hold the rcp username that
                            is configured on the device. A query
                            placed on this variable with a
                            username/password combination, would
                            return a boolean response (0 for a match,
                            −1 for failure or null/noSuchInstance if
                            the value is not configured on the device
                            or it the protocol is not supported) after
                            checks are made by agent on all the rows
                            in this table. A match is found only if
                            one of the rows match with the
                            combination sent in the query."
                ::= { rcpCredsEntry 1 }
    rcpPassword OBJECT-TYPE
                SYNTAX DisplayString (SIZE (0..255))
                ACCESS read-only
                STATUS mandatory
                DESCRIPTION
                            "A textual description of the entity. This
                            value should hold the rcp Password that
                            is configured on the device. A query
                            placed on this variable with a
                            username/password combination, would
                            return a boolean response (0 for a match,
                            −1 for failure or null/no SuchInstance if
                            the value is not configured on the device
                            or it the protocol is not supported) after
                            checks are made by agent on all the rows
                            in this table. A match is found only if
                            one of the rows match with the
                            combination sent in the query."
                ::= { rcpCredsEntry 2 }
```

What is claimed is:

1. A method for verifying information on a managed device, comprising:

receiving, from a requester that stores an incorrect attribute value for an SNMP MIB object and that is unable to read and write the SNMP MIB object directly, and unable to obtain MIB object specification information, and that does not have a correct value for the SNMP MIB object, a SNMP GET request identifying an SNMP MIB object and also containing a plurality of non-null values comprising proposals for a correct value of the SNMP MIB object, wherein the SNMP GET request requests a determination as to whether any of the values matches the correct value stored in the SNMP MIB object of the managed device; and determining whether any of the values matches the correct value stored in the SNMP MIB object; and completing execution of the SNMP GET request by:

transmitting a notification message indicating whether any of the values matches the correct value of the SNMP MIB object and without providing the correct value in response to the SNMP GET request; wherein the notification message identifies an index position, within the plurality of non-null values identified by the SNMP GET request, of the correct value stored in the SNMP MIB object.

2. The method of claim 1, wherein the SNMP MIB object specification information is not generally available.

3. The method of claim 1, wherein the SNMP MIB object stores an attribute for a user credential for a protocol other than SNMP.

4. The method of claim 1, wherein the SNMP MIB object stores a username or a password for one member of the following group consisting of: a telnet protocol, a SSH protocol, a TFTP protocol, a RCP protocol, a SNMP protocol, a TACACS protocol, and a RADIUS protocol.

5. The method of claim 1, wherein the determining step results in determining that none of the values matches the correct value of the SNMP MIB object, and wherein the transmitting step completing execution of the request comprises transmitting a notification message that includes an error message that describes an encountered problem in determining whether any of the values matches the correct value of the SNMP MIB object.

6. The method of claim 1, wherein the transmittal step comprises the step of storing, in a specified MIB object of the managed device, a notification value indicating whether any of the values matches the correct value of the SNMP MIB object.

7. A computer-readable storage medium storing one or more sequence of instructions for verifying information on a managed device, which when executed cause one or more processors to perform:

receiving, from a requester that stores an incorrect attribute value for an SNMP MIB object and that is unable to read and write the SNMP MIB object directly, and unable to obtain MIB object specification information, and that does not have a correct value for the SNMP MIB object, a SNMP GET request identifying an SNMP MIB object and also containing a plurality of non-null values comprising proposals for a correct value of the SNMP MIB object, wherein the SNMP GET request requests a determination as to whether any of the values matches the correct value stored in the SNMP MIB object of the managed device;

determining whether any of the values matches the correct value stored in the SNMP MIB object; and completing execution of the SNMP GET request by:

transmitting a notification message indicating whether any of the values matches the correct value of the SNMP MIB object and without providing the correct value in response to the SNMP GET request; wherein the notification message identifies an index position, within the plurality of non-null values identified by the SNMP GET request, of the correct value stored in the SNMP MIB object.

8. The computer-readable storage medium of claim 7, wherein the SNMP MIB object specification information is not generally available.

9. The computer-readable storage medium of claim 7, wherein the SNMP MIB object stores an attribute for a user credential for a protocol other than SNMP.

10. The computer-readable storage medium of claim 7, wherein the SNMP MIB object stores a username or a password for one member of the following group consisting of: a telnet protocol, a SSH protocol, a TFTP protocol, a RCP protocol, a SNMP protocol, a TACACS protocol, and a RADIUS protocol.

11. The computer-readable storage medium of claim 7, wherein the determining step results in determining that none of the values matches the correct value of the SNMP MIB object, and wherein the transmitting step comprises transmitting a notification message that includes an error message that describes an encountered problem in determining whether any of the values matches the correct value of the SNMP MIB object.

12. The computer-readable storage medium of claim 7, wherein the transmitting step completing execution of the request comprises the step of storing, in a specified MIB object of the managed device, a notification value indicating whether any of the values matches the correct value of the SNMP MIB object.

13. An apparatus for verifying information on a managed device, comprising:

one or more processors;

means for receiving, from a requester that stores an incorrect attribute value for an SNMP MIB object and that is unable to read and write the SNMP MIB object directly, and unable to obtain MIB object specification information, and that does not have a correct value for the SNMP MIB object, a SNMP GET request identifying an SNMP MIB object and also containing a plurality of non-null values comprising proposals for a correct value of the SNMP MIB object, wherein the SNMP GET request requests a determination as to whether any of the values matches the correct value stored in the SNMP MIB object of the managed device;

means for determining whether any of the values matches the correct value stored in the SNMP MIB object; and means for completing execution of the SNMP GET request comprising:

means for transmitting a notification message indicating whether any of the values matches the correct value of the SNMP MIB object and without providing the correct value in response to the SNMP GET request; wherein the notification message identifies an index position, within the plurality of non-null values identified by the SNMP GET request, of the correct value stored in the SNMP MIB object.

14. The apparatus of claim 13, wherein the SNMP MIB object specification information is not generally available.

15. The apparatus of claim 13, wherein the SNMP MIB object stores an attribute for a user credential for a protocol other than SNMP.

16. The apparatus of claim 13, wherein the SNMP MIB object stores a username or a password for one member of the following group consisting of: a telnet protocol, a SSH protocol, a TFTP protocol, a RCP protocol, a SNMP protocol, a TACACS protocol, and a RADIUS protocol.

17. The apparatus of claim 13, wherein the means for determining determines that none of the values matches the correct value of the SNMP MIB object, and wherein the means for transmitting transmits a notification message that includes an error message that describes an encountered problem in determining whether any of the values matches the correct value of the SNMP MIB object.

18. The apparatus of claim 13, wherein the means for transmitting comprises means for storing, in a specified MIB object of the managed device, a notification value indicating whether any of the values matches the correct value of the SNMP MIB object.

19. An apparatus, comprising:
one or more processors; and
a computer-readable storage medium storing one or more sequences of instructions for verifying information on a managed device, wherein execution of the one or more sequences of instructions by the one or more processors causes the one or more processors to perform the steps of:
receiving, from a requester that stores an incorrect attribute value for an SNMP MIB object and that is unable to read and write the SNMP MIB object directly, and unable to obtain MIB object specification information, and that does not have a correct value for the SNMP MIB object, a SNMP GET request identifying an SNMP MIB object and also containing a plurality of non-null values comprising proposals for a correct value of the SNMP MIB object,
wherein the SNMP GET request requests a determination as to whether any of the values matches the correct value stored in the SNMP MIB object of the managed device,
determining whether any of the values matches the correct value stored in the SNMP MIB object; and
completing execution of the SNMP GET request by:
transmitting a notification message indicating whether any of the values matches the correct value of the SNMP MIB object
and without providing the correct value in response to the SNMP GET request; wherein the notification message identifies an index position, within the plurality of non-null values identified by the SNMP GET request, of the correct value stored in the SNMP MIB object.

20. The apparatus of claim 19, wherein the SNMP MIB object specification information is not available.

21. The apparatus of claim 19, wherein the SNMP MIB object stores an attribute for a user credential for a protocol other than SNMP.

22. The apparatus of claim 19, wherein the SNMP MIB object stores a username or a password for one member of the following group consisting of: a telnet protocol, a SSH protocol, a TFTP protocol, a RCP protocol, a SNMP protocol, a TACACS protocol, and a RADIUS protocol.

23. The apparatus of claim 19, wherein the determining step results in determining that none of the values matches the correct value of the SNMP MIB object, and wherein the transmitting step comprises transmitting a notification message that includes an error message that describes an encountered problem in determining whether any of the values matches the correct value of the SNMP MIB object.

24. The apparatus of claim 19, wherein the transmitting step comprises the step of storing, in a specified MIB object of the managed device, a notification value indicating whether any of the values matches the correct value of the SNMP MIB object.

\* \* \* \* \*

UNITED STATES PATENT AND TRADEMARK OFFICE
CERTIFICATE OF CORRECTION

PATENT NO. : 7,779,420 B1  Page 1 of 1
APPLICATION NO. : 10/674577
DATED : August 17, 2010
INVENTOR(S) : Sathyanarayana Nagendra Puttu et al.

It is certified that error appears in the above-identified patent and that said Letters Patent is hereby corrected as shown below:

In column 22, claim 8, line 12, delete "generally"
In column 22, claim 14, line 64, delete "generally"

Signed and Sealed this

Second Day of November, 2010

David J. Kappos
*Director of the United States Patent and Trademark Office*